UNITED STATES PATENT OFFICE.

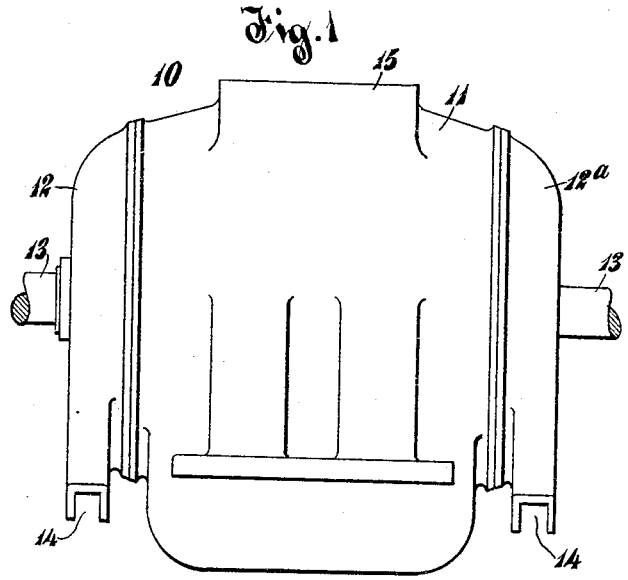
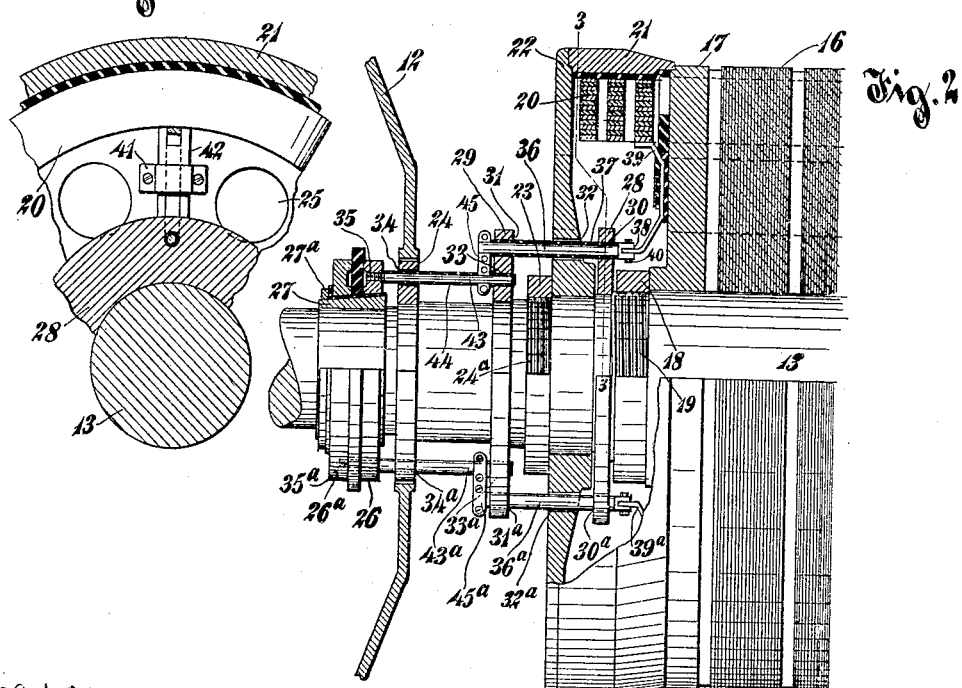

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

ROTOR CONSTRUCTION.

932,662.      Specification of Letters Patent.      Patented Aug. 31, 1909.

Application filed January 31, 1907. Serial No. 355,088.

*To all whom it may concern:*

Be it known that I, ALFRED H. WOUTERS, belonging to the Netherlands, residing at Norwood, in the county of Hamilton and State of Ohio, have invented certain new and useful Improvements in Rotor Construction, of which the following is a full, clear, and exact specification.

My invention relates to dynamo-electric machines and particularly to rotary members of high speed machines such as rotary field members of turbo-alternators.

Heretofore considerable difficulty has been experienced in supporting the collector leads of high speed rotary members so that they will not be broken by centrifugal force, or disconnected from the winding or collector rings.

The object of my invention is to provide a novel collector lead construction which can be employed in machines of any size or speed of rotation without any danger of being injured or broken by the action of centrifugal force.

With this end in view, my invention consists in certain novel details of construction, and combinations and arrangements of parts which will be fully described in the specification and set forth in the appended claims.

Figure 1 is an elevation of an inclosed high speed turbo-alternator to which my invention is adapted to be applied; Fig. 2 is a partial sectional elevation of a high speed rotor equipped with my invention; and Fig. 3 is a partial transverse section along the line 3—3 of Fig. 2.

Referring now to the figures of the drawings, 10 represents an inclosing housing or casing of a high speed dynamo-electric machine, consisting of a middle or main portion 11 and two end portions 12 and 12ª. The end portions are provided with shaft openings through which the ends of the shaft 13 extend. The end portions 12 and 12ª are each provided with an air inlet opening 14 and the main or central portion 11 is provided with an air outlet opening or chimney 15, air being forced either by fans on the rotor or by a separate blower through the inlet openings, through the stator core and out through the chimney or outlet opening 15.

Mounted on the shaft 13 within the housing is a rotary core 16 consisting, in this case, of laminæ clamped between the end heads, one of which is shown at 17. The end plate 17 is held in position by a nut 18 which engages the threaded portion 19 of the shaft. The core is slotted and is provided with a winding, the end portions of the coils of which are shown at 20. The ends of the coils are inclosed within an end shield or cover consisting, in this case, of a ring or annular member 21 which surrounds the coils and an annular end disk or plate 22 mounted on the shaft. The ring 21 is supported on the edge of the end plate 17 and also upon the annular disk 22. The annular disk 22 is held in position by a nut 23 which engages the threaded portion 24ª of the shaft. The disk and core are provided with ventilating openings 25 shown in dotted lines in Fig. 2 and in full lines in Fig. 3. The portions of the shaft extending through the end members 12 and 12ª of the housing are each provided with a stuffing ring 24. The walls of the housing fit closely around the stuffing rings so that there is just sufficient clearance to prevent contact between said parts. The stuffing rings prevent air from being drawn through the shaft openings in the ends of the housing and also serve another purpose which will be explained shortly. Located outside the housing, in this instance at one end thereof, are the collector rings 26 and 26ª. As here shown, the rings are mounted on a cone-shaped sleeve 27 and are clamped thereon by a nut 27ª. If desired, the two collector rings may be mounted one at each end of the housing, instead of both being mounted at the same end, and may be supported directly on the shaft.

Mounted on the shaft within the rotor and between the annular end disk 22 and the nut 18 is an annular member or disk-like ring 28, and mounted on the shaft outside the rotor between the nut 23, which holds the annular end disk 22 in position, and the stuffing ring 24, is a second annular member or disk-like ring 29. The rings 24, 28 and 29 may be shrunk on the shaft or may be forced on when cold by means such as hydraulic pressure. The rings are made of strong material such as nickel steel so as to be able to withstand the stresses due to centrifugal force without bursting. The ring 28 is provided with two openings or perforations 30 and 30ª to receive collector lead conductors, the openings as here shown being 180° apart. The angular spacing of the openings and the collector leads, however, may be different, depending upon the positions of the positive and negative terminals of the winding. The ring 29 is provided with two openings 31 and 31ª which correspond in size and location to the openings 30 and 30ª in the ring 28. The pairs of openings 30 and 31, and 30ª and 31ª are in axial alinement. The end disk 22 is also provided with openings 32 and 32ª in axial alinement with the openings in the two rings 28 and 29, but preferably slightly larger than said openings. The ring 29 is also provided with two openings 33 and 33ª, these openings being near the axis of the shaft and preferably, though not necessarily, in the same diametrical line as the openings 31 and 31ª. The stuffing ring 24 is provided with openings 34 and 34ª which are in axial alinement with the openings 33 and 33ª in the ring 29. The collector ring 26 is provided with an opening 35 in axial alinement with the openings 34 and 33 in the rings 24 and 29 and collector rings 26 and 26ª are provided with openings 35ª in alinement with openings 34ª and 33ª in the rings 24 and 29.

Fitting tightly in the openings 30 and 31 of the rings 28 and 29 so as to be supported thereby and extending through the opening 32 in the annular end disk 22 of the rotor is an axial rod, bar, or rigid conductor 36. If desired the rod may have a tight fit in the opening 32 in the end disk 22. The rod is provided with an insulating sleeve 37 which insulates the rod from the supporting rings 28 and 29, and from the end disk 22 of the rotor. The ends of the rod 36 extend beyond the supporting rings or annular members 28 and 29. The inner end is slotted as shown at 38, and receives the end of a conductor 39, the two parts of the rod and the conductor 39 being clamped tightly together by a transverse pin or bolt 40. The conductor 39, which may be an integral extension of the field winding or may be a separate conductor fastened thereto, is preferably clamped against the core by a cleat 41, being insulated from the cleat and core by insulation 42. Mounted in the alined openings 33 and 34 in the rings 29 and 24, and fitting tightly into the opening 35 in the collector ring 26 so as to be in good electrical engagement therewith is a second rod, bar or rigid conductor 43. This rod 43 is insulated from the rings 29 and 24 by an insulating sleeve 44, and is electrically connected to the end of bar 36 by straps 45 clamped about said rods. The rod 43 may be supported at its ends and have a loose fit in the stuffing ring 24 or it may have a tight fit in said ring. Also supported by the rings 28 and 29 in the openings 30ª and 31ª is a rod 36ª similar to bar 36 and forming a part of the second collector lead. Supported in rings 29 and 24 in the openings 33ª and 34ª and in electrical engagement with collector ring 26ª is a fourth rod 43ª similar to rod 43. The inner end of rod 36ª is connected to conductor 39ª, which is the other terminal or leads to the other terminal of the field winding. The rods 36ª and 43ª are electrically connected together by straps or clamps 45ª similar to the clamps 45. Thus one end of the winding is connected to collector ring 26 by conductor 39, rods 36 and 43, and clamp 45, and the other end of the winding is connected to collector ring 25ª by conductor 39ª, rods 36ª and 43ª, and clamp 45ª. It will be seen that the construction is so rigid and all the parts are so well supported that there is no danger of any of said parts being injured or displaced or the connections between the winding and collector rings broken.

The construction and arrangement here shown can be modified to a considerable extent without departing from the scope of my invention, and I aim in my claims to cover all such modifications.

What I claim as new and desire to secure by Letters Patent is:—

1. In a rotor of a dynamo-electric machine, a shaft, a core mounted on the shaft, a winding carried by the core, a collector ring, and means for connecting the winding and the collector ring, comprising a plurality of overlapping straight rods parallel to the axis and connected in series between the ring and the winding.

2. In a rotor of a dynamo-electric machine, a shaft, a core mounted on the shaft, a winding carried by the core, a collecting device, means for connecting the winding and collecting device comprising a plurality of straight rods or bars parallel to the rotor axis at different distances therefrom and electrically connected in series between the collecting device and the winding, and a plurality of rings mounted on the shaft and supporting said rods, one of the rings supporting two of said series-connected rods.

3. In a rotor of a dynamo-electric machine, a shaft, a core mounted on the shaft, a winding carried by the core, a collector ring, and means for connecting the winding and the collector ring comprising a plurality of straight rods or bars electrically connected in series and extending parallel to the rotor axis, said bars being at different distances from such axis.

4. In a rotor of a dynamo-electric machine, a shaft, a core mounted on the shaft, a winding carried thereby, a collector ring, and means for connecting the winding and collector ring comprising a plurality of straight rods or bars electrically connected in series and extending parallel to the rotor axis.

5. In a rotor of a dynamo-electric machine, a shaft, a core mounted on the shaft, a winding carried by the core, a collector ring, means for connecting the winding to the ring comprising a pair of straight rods or bars extending parallel to the rotor axis and arranged at different distances from the axis of the machine, and means for supporting and retaining the rods or bars in position comprising a plurality of rings or annular members which surround the shaft and through which the rods or bars extend.

6. In a rotor of a dynamo-electric machine, a shaft, a core mounted upon the shaft, a winding carried by the core, an end cover or shield for the winding, a collector ring, and means for connecting the winding and collector ring comprising a straight rod or bar connected to the winding and extending parallel to the rotor axis and out through the end cover or shield, and a second straight rod or bar electrically connected at one end to the first named rod or bar and at the other end to the collector ring and also extending parallel to the rotor axis.

7. In a rotor of a dynamo-electric machine, a shaft, a core mounted upon the shaft, a winding carried by the core, an end cover or shield for said winding, a collector ring, and means for connecting said winding and ring comprising a straight rod or bar connected to the winding and extending parallel to the rotor axis and out through the end cover or shield and a second straight rod or bar electrically connected at one end to the first named rod or bar and at the other end to the collector ring and also extending parallel to the rotor axis, and means for supporting the rods or bars comprising annular members in which the bars or rods are mounted.

8. In a rotor of a dynamo-electric machine, a shaft, a core, a winding carried by the core, a collector ring, and means for connecting the ring to the winding comprising a pair of axial bolts or rods, the first rod or bar being fastened to the end of the winding and mounted in a pair of rings surrounding the shaft, the second rod or bar overlapping the end of the first bar on the same side of the shaft and being supported at one end in a ring in which the first rod or bar is mounted and at the other end in the collector ring, the rods being insulated from their supporting rings and the adjacent ends thereof being electrically connected together.

9. In a dynamo-electric machine, a housing or casing, a rotor including a shaft extending through openings in the ends of the housing or casing, a rotor winding, annular members surrounding the shaft and located in the shaft openings so as to act as stuffing members, a collector ring on the shaft outside of the housing, means for connecting the collector ring to the winding comprising a pair of axial rods, one of the rods being secured at one end to the collector ring and passing through the stuffing member to a point within the housing, a second annular member on the shaft within the housing and supporting the other end of the rod, a third annular member surrounding the shaft within the housing, the second rod passing through and being supported by the second and third annular members and being electrically connected to the first rod and to the end of the winding.

In testimony whereof I affix my signature, in the presence of two witnesses.

ALFRED H. WOUTERS.

Witnesses:
ARTHUR F. KWIS,
FRED J. KINSEY.